US011059601B2

(12) United States Patent
Molnar et al.

(10) Patent No.: US 11,059,601 B2
(45) Date of Patent: Jul. 13, 2021

(54) WATER AND LIGHTING DISPLAYS INCLUDING UNMANNED AERIAL SYSTEM

(71) Applicants: Dezso Molnar, Sun Valley, CA (US); John Canavan, Sun Valley, CA (US)

(72) Inventors: Dezso Molnar, Sun Valley, CA (US); John Canavan, Sun Valley, CA (US)

(*) Notice: Subject to any disclaimer, the term of this patent is extended or adjusted under 35 U.S.C. 154(b) by 0 days.

(21) Appl. No.: 15/393,113

(22) Filed: Dec. 28, 2016

(65) Prior Publication Data

US 2017/0240296 A1 Aug. 24, 2017

Related U.S. Application Data

(60) Provisional application No. 62/271,775, filed on Dec. 28, 2015.

(51) Int. Cl.
| | | |
|---|---|---|
| *B05B 17/08* | (2006.01) | |
| *B64D 47/02* | (2006.01) | |
| *G09F 21/06* | (2006.01) | |
| *G09F 19/22* | (2006.01) | |
| *G09F 19/18* | (2006.01) | |
| *G09F 13/30* | (2006.01) | |
| *B64C 39/02* | (2006.01) | |

(52) U.S. Cl.
CPC ............ *B64D 47/02* (2013.01); *B05B 17/08* (2013.01); *B64C 39/024* (2013.01); *G09F 13/30* (2013.01); *G09F 19/18* (2013.01); *G09F 19/22* (2013.01); *G09F 21/06* (2013.01); *B64C 2201/12* (2013.01); *B64C 2201/141* (2013.01)

(58) Field of Classification Search
CPC ............ B64C 39/024; B64C 2201/127; B64C 2201/12; G03B 21/562; G03B 21/608; G03B 21/00; G03B 21/56; H04N 9/3147; H04N 7/181; H04N 5/23293; B64D 1/22; B64D 47/08; B05B 17/08
USPC ..................................... 239/17, 18; 348/744
See application file for complete search history.

(56) References Cited

U.S. PATENT DOCUMENTS

| | | | |
|---|---|---|---|
| 3,503,574 | A | 3/1970 | Eickmann |
| 4,010,619 | A | 3/1977 | Hightower et al. |
| 5,293,304 | A | 3/1994 | Godfrey |
| 5,769,359 | A | 6/1998 | Rutan et al. |
| 6,200,185 | B1 | 3/2001 | Kuster, Jr. |
| 6,270,038 | B1 | 8/2001 | Cycon et al. |
| 6,547,180 | B1 | 4/2003 | Cassidy |

(Continued)

FOREIGN PATENT DOCUMENTS

| | | |
|---|---|---|
| CN | 103241377 | 8/2013 |
| CN | 203294314 | 11/2013 |

(Continued)

OTHER PUBLICATIONS

Vila, Oscar; [Power Electronics 01] Design of the Power Electronics of a Tethered UAV; Master Thesis; Bio, Electro and Mechanical Systems, http://beams.ulb.ac.be/student-projects; Oct. 20, 2014; 2 pages.

(Continued)

*Primary Examiner* — Qingzhang Zhou
(74) *Attorney, Agent, or Firm* — Maceiko IP

(57) ABSTRACT

A water and lighting display that includes an unmanned aerial system (UAS) is disclosed. The UASs may illuminate water shot out of the water fountains, may fly in formation or may include removable payloads.

19 Claims, 15 Drawing Sheets

(56) References Cited

U.S. PATENT DOCUMENTS

| | | |
|---|---|---|
| 6,575,402 B1 | 6/2003 | Scott |
| 6,749,154 B1 | 6/2004 | Johnson |
| 6,933,965 B2 | 8/2005 | Heafitz |
| 7,055,994 B2 | 6/2006 | Martin |
| 7,082,706 B1 | 8/2006 | Stinis et al. |
| 7,249,732 B2 | 7/2007 | Sanders et al. |
| 7,324,016 B1 | 1/2008 | Milgram |
| 7,414,546 B2 | 8/2008 | Singer et al. |
| 7,472,866 B2 | 1/2009 | Heaston et al. |
| 7,631,834 B1 | 12/2009 | Johnson et al. |
| 7,668,403 B2 | 2/2010 | Kanowitz |
| 8,056,461 B2 | 11/2011 | Bossert et al. |
| 8,091,822 B2 | 1/2012 | Boyce |
| 8,100,649 B2 | 1/2012 | Okimura |
| 8,109,711 B2 | 2/2012 | Blumer et al. |
| 8,123,460 B2 | 2/2012 | Collette |
| 8,157,383 B2 | 4/2012 | Scanlon |
| 8,369,399 B2 | 2/2013 | Egnal et al. |
| 8,434,920 B2 | 5/2013 | Jones |
| 8,511,828 B2 * | 8/2013 | Fuller .................... G09F 19/18 353/28 |
| 8,554,395 B2 | 10/2013 | Andersson |
| 8,567,718 B1 | 10/2013 | McDonnell |
| 8,596,572 B1 | 12/2013 | Kirshman et al. |
| 8,600,602 B1 | 12/2013 | McAndrew et al. |
| 8,646,719 B2 | 2/2014 | Morris et al. |
| 8,777,157 B2 | 7/2014 | Barrett et al. |
| 8,825,225 B1 | 9/2014 | Stark et al. |
| 8,862,285 B2 | 10/2014 | Wong et al. |
| 9,169,030 B2 * | 10/2015 | Wong .................... B64D 47/02 |
| 9,174,733 B1 * | 11/2015 | Burgess .................. B64D 1/12 |
| 10,364,026 B1 | 7/2019 | Hanlon et al. |
| 10,384,777 B1 | 8/2019 | Welsh |
| 2002/0049728 A1 | 4/2002 | Kaku |
| 2002/0171927 A1 | 11/2002 | Barnes |
| 2004/0020999 A1 | 2/2004 | Beidokhti |
| 2005/0146884 A1 | 7/2005 | Scheithauer |
| 2005/0219479 A1 | 10/2005 | Mugrauer |
| 2006/0140644 A1 | 6/2006 | Paolella |
| 2008/0165547 A1 | 7/2008 | Amor et al. |
| 2008/0313937 A1 | 12/2008 | Boyce |
| 2010/0027281 A1 | 2/2010 | Waters et al. |
| 2011/0180667 A1 | 7/2011 | O'Brien et al. |
| 2012/0044710 A1 * | 2/2012 | Jones .................... B64C 39/024 362/470 |
| 2012/0056041 A1 | 3/2012 | Rhee et al. |
| 2012/0112008 A1 | 5/2012 | Holifield et al. |
| 2012/0153087 A1 | 6/2012 | Collette |
| 2012/0200703 A1 | 8/2012 | Nadir et al. |
| 2012/0250335 A1 | 10/2012 | Nakano |
| 2013/0062457 A1 | 3/2013 | Deakin |
| 2013/0077330 A1 | 3/2013 | Hessling |
| 2013/0134254 A1 | 5/2013 | Moore |
| 2013/0233964 A1 | 9/2013 | Woodworth et al. |
| 2013/0248097 A1 | 9/2013 | Ploss, Jr. |
| 2013/0314502 A1 * | 11/2013 | Urbach ................. H04N 7/181 348/46 |
| 2014/0002990 A1 | 1/2014 | Sharma et al. |
| 2014/0018976 A1 | 1/2014 | Goossen et al. |
| 2014/0131510 A1 | 5/2014 | Wang et al. |
| 2014/0217242 A1 | 8/2014 | Muren et al. |
| 2014/0231590 A1 | 8/2014 | Trowbridge et al. |
| 2014/0233099 A1 | 8/2014 | Stark et al. |
| 2014/0236388 A1 * | 8/2014 | Wong .................... F21V 21/15 701/2 |
| 2014/0257595 A1 | 9/2014 | Tillmann |
| 2014/0263852 A1 | 9/2014 | Walker et al. |
| 2014/0268838 A1 | 9/2014 | Kimball et al. |
| 2014/0374535 A1 | 12/2014 | Wong et al. |
| 2015/0129716 A1 | 5/2015 | Yoffe |
| 2015/0154890 A1 | 6/2015 | Savitsky et al. |
| 2015/0329218 A1 | 11/2015 | McDonnell et al. |
| 2015/0362917 A1 | 12/2015 | Wang et al. |
| 2016/0033855 A1 | 2/2016 | Wong et al. |
| 2016/0041628 A1 * | 2/2016 | Verma .................... G06F 3/017 345/156 |
| 2016/0068266 A1 | 3/2016 | Carroll |
| 2016/0200437 A1 | 7/2016 | Ryan et al. |

FOREIGN PATENT DOCUMENTS

| | | |
|---|---|---|
| DE | 20 2009 01729 | 3/2010 |
| JP | 2012-190557 | 10/2012 |
| JP | 2013-211200 | 10/2013 |
| KR | 10-2008-0074045 | 8/2008 |
| KR | 10-2010-0041367 | 4/2010 |
| KR | 10-2011-0090231 | 8/2011 |
| WO | WO 2002-044809 | 6/2002 |
| WO | WO 2006-016018 | 2/2006 |
| WO | WO 2007-141795 | 12/2007 |
| WO | WO 2013-162128 | 10/2013 |

OTHER PUBLICATIONS

Eurolink Systems; Cobra—Micro Tethered Surveillance; ERMES by EuroLink Systems, ERMES Technologies; Oct. 21, 2014, 3 pages.

Finch, Andy and Ballew, Eric; Direct Spray Cooling and System-Level Comparisons; Electronics Cooling Magazine; www.electronics-cooling.com; Aug. 1, 2009; 5 pages.

Staes, Patrick; Drone @ Work; Aerial Imaging and Filming; http://drone-at-work.com; Oct. 21, 2014, 6 pages.

Quick, Darren; CyPhy Works' UAVs Use Ground-Based Power to Stay Aloft Indefinitely; www.gizmag.com, Dec. 5, 2012, 4 pages.

Burkhart, Ford; DSS 2013: Tiny Drone Flies on Fiber-Optic Power; the business of photonics optics.org; http://optics.org/news; May 2, 2013; 2 pages.

LEDs Magazine; Oxley Supplies LED Lights to BAE Unmanned Air Vehicle; www.ledsmagazine.com; Oct. 17, 2014; 11 pages.

"Heat Transport by Radiation", U.S. Appl. No. 14/922,061, filed Feb. 9, 2017 Office Action, dated May 2010, 3 pages.

Lai, Yan, et al., "Liquid Cooling of Bright LEDs for Automotive Applications", 2009, Applied Thermal Engineering 29 (2009), pp. 1239-1244, U.S. Appl. No. 14/922,061, filed Feb. 9, 2017 Office Action.

PCT, International Search Report and Written Opinion of the International Searching Authority, PCT/US2015/057249, dated Feb. 17, 2016, 10 pages.

"Phantom 2 User Manual V1.1," Apr. 30, 2014, 2013-2014 DJI Innovations, 34 pages, U.S. Appl. No. 14/922,061, filed Feb. 9, 2017 Office Action.

"Spreading Wings S900 User Manual", Aug. 2014, 2014 DJI, 32 pages, U.S. Appl. No. 14/922,061, filed Feb. 9, 2017 Office Action.

Wang, Ruishan, et al., "A Cooling System with a Fan for Thermal Management of High-Power LEDs", Aug. 2010, J. Mod. Phys., 2010, 1, pp. 196-199, U.S. Appl. No. 14/922,061, filed Feb. 9, 2017 Office Action.

* cited by examiner

WATER AND LIGHTING DISPLAYS
INCLUDING UNMANNED AERIAL SYSTEM

CROSS REFERENCE TO RELATED APPLICATIONS

This application claims the benefit of U.S. Provisional Application No. 62/271,775, filed Dec. 28, 2015, the contents of which are incorporated herein by reference.

FIELD OF THE INVENTION

The field of the invention generally relates to water and lighting displays, including those that involve unmanned aerial systems (UASs).

BACKGROUND OF THE INVENTION

In recent years, elaborate water and lighting displays have been developed. For example, the fountains in front of the Bellagio Hotel have been seen and enjoyed by millions of people from around the world. Other displays have been developed that continue to make innovative use of water and light.

Regarding the lighting elements, these displays have involved lights that shine at different angles and change color. In addition, these lighting systems may be generally configured and attached to the ground or within a fountain basin. They may also be attached to ground-based structures such as stationary platforms, buildings or towers, tracks with carriages that run along the tracks and to which the lighting systems may be attached, buildings that may include mounts upon which the lighting systems may be attached or other structures.

However, the lights in many of the foregoing configurations are often at or near ground level, which generally limits the location from which the light may emanate. The lights of other configurations listed above may be located higher, or may travel along tracks or cables or may rotate about an axis. But even with these types of structures, the lights are ultimately anchored to a location and/or may be bound in terms of their lighting coverage. This may limit the visual effects provided by the lighting system. That is, the lights may not be able to move in a certain direction or move in other manners such as rotation if those capabilities are outside of their design parameters.

Accordingly, there is a need in the field of water and lighting displays for lights that may move in various directions and in different manners, and that may emit light from above the ground. There is also a need for manners in which such lighting may be used with water and/or light displays to provide enhanced visual effects.

The current invention addresses the limitations and shortcomings of lighting assemblies and systems that are generally ground-based and that provide only limited configuration of providing light.

SUMMARY OF THE INVENTION

In a first aspect of the invention, the use of UASs with water and lighting displays is described. To this end, UASs may add to or otherwise enhance the visual effects provided by the display. For example, the UAS(s) may carry lighting systems so that lights may be shined at water or other features in the display from an elevated position. Furthermore, the UAS(s) may move thereby changing the position from which light is shined. Still further, the flight of the UAS(s) may in and of itself enhance the visual effects provided by the display.

In another aspect of the invention one or more UASs may be piloted or programmed to perform desired flight plans or choreographies. To this end, the choreography of the UAS(s) may be programmed to complement the direction and/or intensity of shooting water and/or lighting of a display. In this manner, the overall expression or visual effect of the display may be enhanced.

In another aspect of the invention, the UAS(s) may provide lighting capability at high elevations relative to the water source without the need to construct supporting towers or other supports, such as unsightly and potentially dangerous scaffolding, or rely on attaching an elevated lighting system to a nearby building. In this manner, the current invention provides a cost-savings benefit and provides greater flexibility to the manner in which lighting may be provided to a display or otherwise.

BRIEF DESCRIPTION OF THE DRAWINGS

FIG. 12B is a view of a UAS configured with a water container and hovering.

FIG. 12C is a view of a UAS configured with a water container and submerging water container in a water basin.

DETAILED DESCRIPTION OF THE PREFERRED EMBODIMENTS

Figure 1:
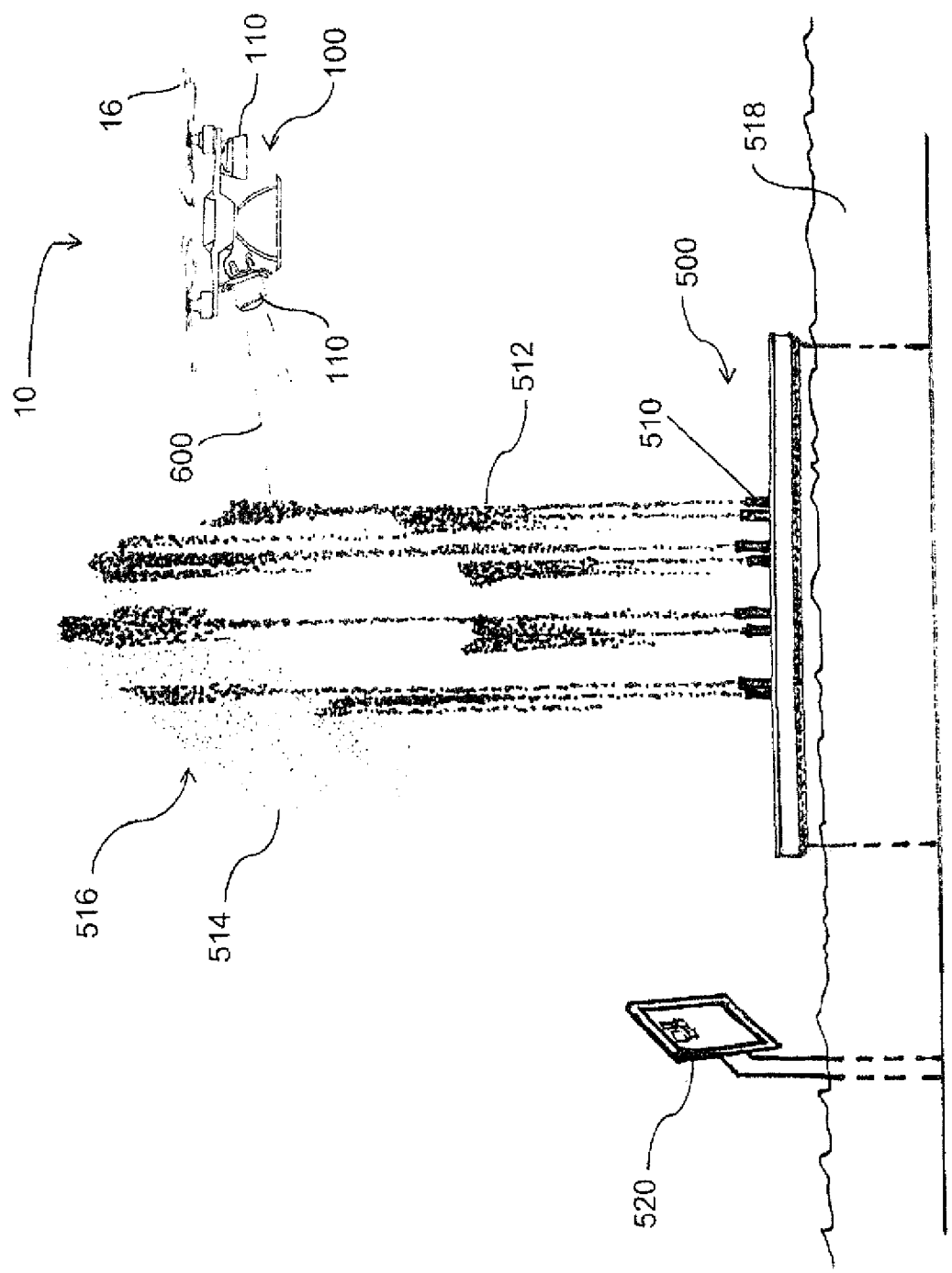
FIG. 1 shows a water and lighting display including a UAS.

The following detailed description is not intended to limit the current invention, in that alternate embodiments will be apparent to those skilled in the art and are within the scope of the invention. For example, some of the lighting systems, configurations of the lighting systems, and applications of the lighting systems of the current invention may assume different configurations and may utilize different types and numbers of UASs. Furthermore, one or more different types of lighting systems, configurations or applications may be used. The current invention is now described with reference to the figures. Similar reference numerals may be used throughout the figures to denote the same or similar components.

The current invention generally involves the use of one or more UASs to enhance the lighting and other visual effects that may be provided by displays, such as water and lighting displays. For example, as shown in FIG. 1, UAS 10 may provide a movable lighting system located above the ground that may illuminate water displays or other structures from this elevated position. In the embodiment of FIG. 1, UAS 10 may include a lighting system 100 that may include lighting assemblies 110 that may shine one or more beams of light 600 onto water stream 512 that may emanate from nozzle 510 of water display 500. In this configuration, UAS 10 with lighting system 100 and lighting assembly 110 may provide illumination to water stream 512 from unique perspectives and vantage points not attainable with ground-based lighting systems. At the same or different time, another lighting assembly 110 on UAS 10 may shine light downwardly or in some other direction. The manner in which UAS 10 may be fitted with lighting 100 is further described in U.S. Provisional Ser. No. 62/067,978, the contents of which are incorporated by reference as if fully set forth herein.

UAS lighting system 100 may also shine one or more beams of light upon fog or water mist 516 that may exist in areas generally above and around water stream 512, as well as on water droplets and water particles 514 that may generally fall from water stream 512. Illuminating fog or mist 516 may provide an illuminated cloud effect, while illuminating water droplets 514 from above while they fall to the ground may result in a "raining light" visual effect. In addition, UAS lighting system 100 may also direct beams of light into basin 518 of water display 500, or onto other structures that may be a part of water display 500 such as reflective sign 520, boats (not shown), characters (not shown) or other structures.

While FIG. 1 shows a single UAS 10, multiple UASs 10 may alternatively be used. This preferably provides further enhancement by elevated lighting systems 100. Furthermore, the one or more UASs 10 may move as they shine light beam(s) 600, which may also enhance the visual effects of display 500.

UASs 10 configured with lighting systems 100 may also perform lighting shows that may shine light onto the audience or onto other targets. This may resemble lighting shows that may be experienced at musical concerts, e.g., light shows involving lasers. In this embodiment, it is preferred that only unharmful lasers or lights be used, i.e., those that do not cause damage to human eyes.

While water stream 512 is depicted as a vertical water stream in FIG. 1, it may be of any shape or type of water element such as a funnel, cone, fan, waterfall, water wall or other shape, and may be directed in any direction such as horizontal, at an angle or in other directions. Also, while the UAS 10 depicted in FIG. 1 as a multi-copter, other types of UASs may also be utilized.

It should be noted that while lighting assembly 110 as shown in FIG. 1 is generally depicted as a directional lighting assembly such as a spotlight, a laser or other type of directional light source, other types of lights and assemblies may be utilized. For example, lighting assembly 110 may instead consist of a multi-directional light such as a bulb, a multi-directional array of LEDs or other type of light source. In addition, lighting assembly 110 may comprise of multiple spotlights or lasers that may shine in different directions, or a combination of multi-directional lighting assemblies, directional lighting assemblies and other light sources. Thus, lighting assembly 110 may shine light in a variety of directions including sideways, upward, downward or in any other direction.

UAS lighting systems 100 that utilize light sources that may cause damage to human eyes may also include controls to avoid pointing these light sources at observers. To this end, GPS and suitable software may control the orientation of UAS 10 and lighting system 100. Also, lighting assembly 110 may comprise lights that shine white light, lights that shine colored light, or lights that shine a combination of white light and colored light. UAS lighting system 100 may be used in lieu of other types of lighting systems, independently of other types of lighting systems or in combination with other types of lighting systems, e.g., ground based lighting systems.

There are various benefits of an elevated UAS lighting system 100. Ground based lighting systems are, by design, limited to illuminating a target from predefined vantage points that are limited by the design of the system. For example, a fixed ground based light may only illuminate a target from its physical position. A lighting system mounted to a carriage that my travel along a track or a wire may illuminate a target only from the positions along the track or wire, but may not illuminate a target from any other positions that are beyond the track or wire. A rotatable lighting system may illuminate a target from any angle of rotation that is available to it, but cannot illuminate a target from any other location.

Advantageously, however, UAS lighting system 100 may illuminate a target from any location, height or angle to which UAS 10 may fly. For example, UAS 10 may be flown to a position that is vertically above fountain 500 such that lighting system 100 may shine a light downward to illuminate fountain stream 512 from above. Alternatively, UAS 10 may be positioned at a different location, such as to the side of the same fountain stream 512 or to a different fountain stream 512, such that it may illuminate fountain stream 512 from the side. Besides the advantage of unique vantage locations from which to illuminate, these vantage points may not need to be predetermined, and no mounts, platforms, tracks or wires need to be pre-designed and constructed as would be necessary for a ground based system to achieve the same lighting results.

In any event, it is preferred that shining light at an object or feature of display 500, such as water stream 512, droplets 514 or mist 516 from different locations generally provides different visual effects. It is also preferred that decisions regarding the vantage points from which illumination occurs may be made in real-time by a show director, or from inputs or requests by remote operators, crowd consensus, online polling or any other suitable decision-making system. As such, the current invention provides for a dynamic and variable enhancement of the visual effects and expression provided by display 500.

As another example of this enhancement, UAS lighting system 100 may continuously illuminate one or more fountain streams 512, while UAS 10 maneuvers to different positions about display 500. For example, UAS 10 with lighting system 100 may perform a spiral maneuver around a vertical fountain stream 512, moving up and down while circling stream 512, all the while illuminating the stream 512. To perform this flight path and lighting effect, UAS 10 may be piloted or programmed to provide this choreography. This represents an advance over ground based lighting systems which require construction of a physical track or intricate cabling system with lighting carriages around fountain stream 512. These tracks or cables require additional money and time to design and construct, and the physical nature of such a ground based lighting system may block the view of the fountain from the audience thus diminishing the aesthetic effect of the overall fountain display 500.

Figure 2:
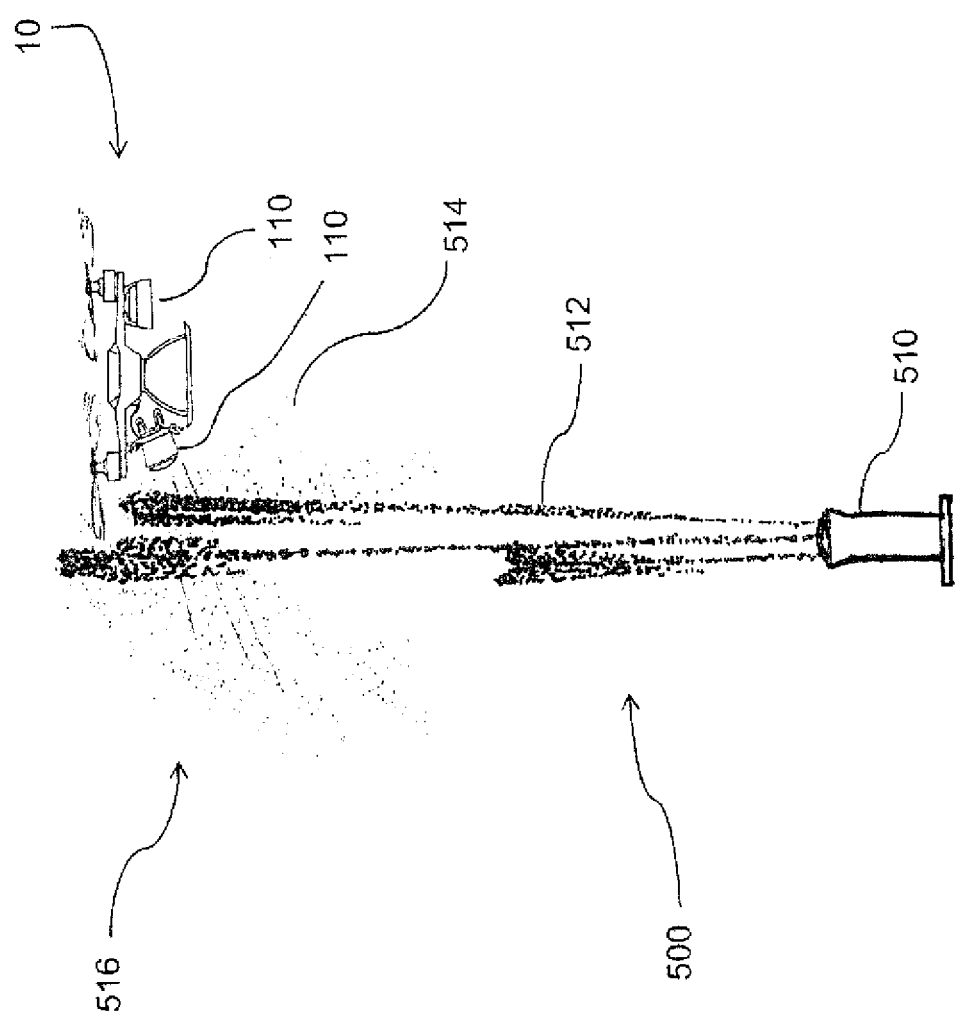
FIG. 2 shows a water stream illuminated by a UAS.

As another example of this enhancement, UAS 10 may fly close and/or also pass through water streams 512, water particles 514 or water mist 516 as part of a choreographed lighting performance. As shown in FIG. 2, lighted UASs 10 flying in proximity to water stream 512 may result in a dramatic and entertaining visual effect. In this situation, it may be preferable for UAS 10 to be configured with water resistant brushless motors that may be capable of providing thrust to UAS 10 without the need for elaborate waterproofing efforts. Other considerations relating to UASs 10 with lighting systems 100 flying directly through or in close proximity to water streams 512 are discussed in more detail below.

With the current invention, water display 500 may be illuminated by lighting systems positioned high above the ground and/or display 500 without the need for tall platforms, towers or other structures that would otherwise be needed to support elevated lighting. The ability to illuminate from high elevations also avoids the need to attach lighting to nearby buildings or other structures that may be nearby. And even if an existing structure such as a neighboring building were available to support lighting, the height, angle and position from which the lighting could illuminate water display 500 may be limited by the location and height of the building. Furthermore, the light beam would degrade as the distance between the light source and display 500 increases. This in turn could limit the ability to adequately illuminate water display 500 or provide enhanced visual effects. Additionally, it may be desired to focus beams of light on separate in-line water streams 512 that may be intermittent or spaced separately or obstructed by other water streams from the line of sight position of the ground based light.

Furthermore, significant design and construction costs would probably be incurred to install and support the lighting in a manner to adequately illuminate display 500. Additional costs and logistics to provide electrical power for such lighting would also be required. Regardless whether this power came from local power lines, from the power system of the associated building, from dedicated power generators, from battery packs or from other sources of power, this requirement would also add significant expense to the construction of the elevated lighting system. If the building or structure were not owned by the same owner of water display 500, additional costs and complex negotiations may be required to lease or purchase a portion of the structure necessary for the installation. Also, legal building permits may be necessary for the allowance of such physical and electrical construction thus adding additional time and expense.

The use of UAS(s) 10 as in the current invention preferably avoids the foregoing issues. As such, the current invention's use of UAS(s) 10 provides cost-savings, reduced logistical requirements, and greater flexibility to the manner in which lighting may be provided.

Furthermore, the current invention may render display 500 relatively self-contained and/or transportable. For example, UASs 10 and their lighting systems 100 are not limited to the physical location of a neighboring building or dedicated light-support structure. Instead, UASs 10 and their lighting systems, including their power supplies are self-contained and require no design and construction of physical structures with associated power sources. Accordingly, to the extent that display 500 is intended to be packed up and transported to various locations, UASs 10 facilitate this capability.

The use of UASs 10 and their lighting systems 100 provide additional advantages regarding the illumination of display 500. For example, no land need be purchased, leased or otherwise dedicated to a lighting system 100, and no building or other land use permits associated with buildings or structures are required. Furthermore, no significant obstruction of view of water display 500 will occur since no additional structures need be built.

Due to the expense, time commitment, lease and/or permits that may be necessary to design and build ground based lighting systems as discussed above, these structures may typically tend to be permanent in nature. Accordingly, it may not make financial sense to construct such structures at such high costs for temporary events or displays. However, the use of UASs 10 configured with lighting systems 100 of the current invention may be employed to provide the elevated lighting necessary for the event at a budget and schedule within reason. Accordingly, as noted above, the current invention may facilitate display 500 traveling from city to city, thus eliminating the requirement to construct new ground based lighting systems, lease space or obtain legal building permits for such traveling events. Alternatively, UAS 10, or a fleet of UASs 10 may be used with different displays 500 at various locations as desired.

Figure 3:
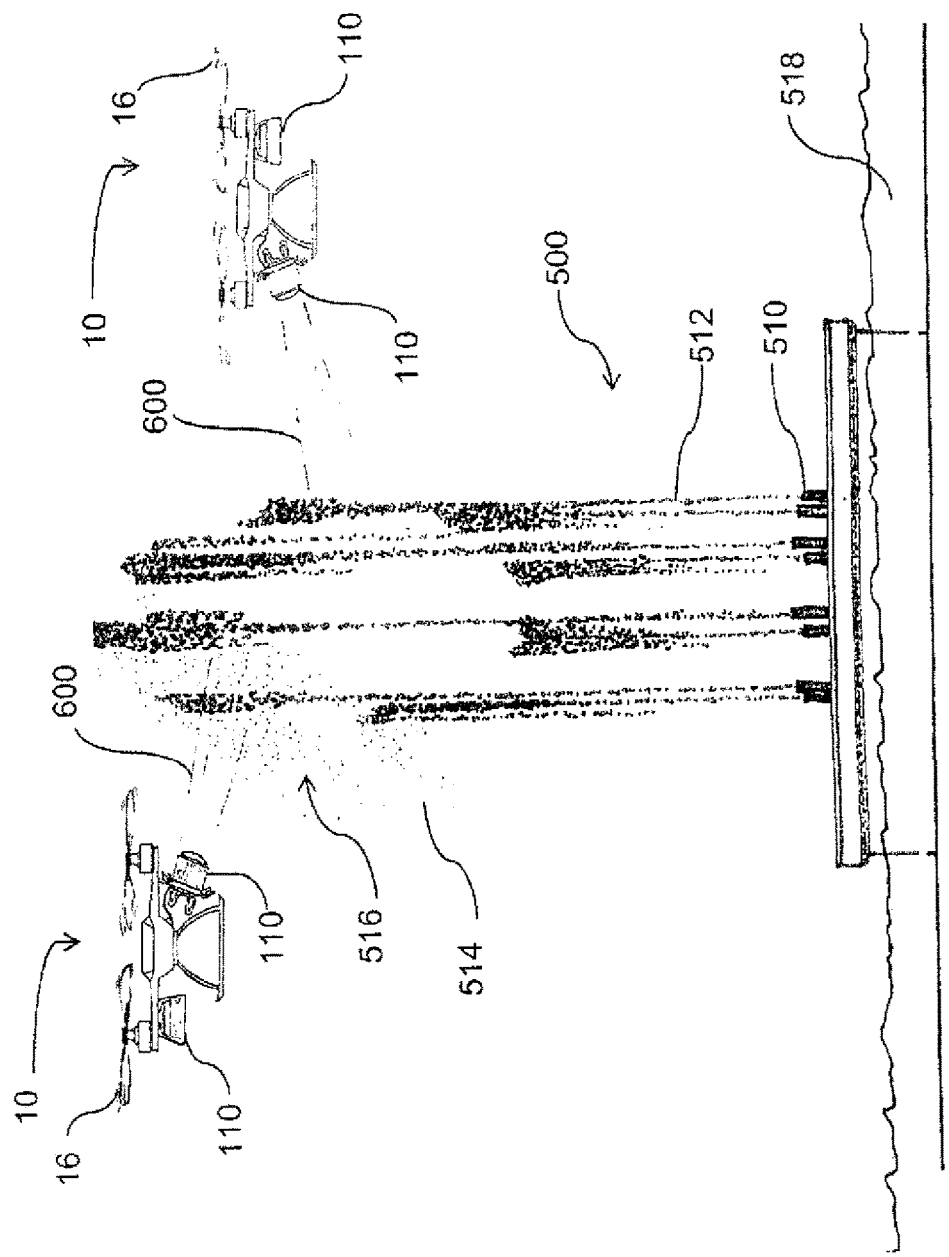
FIG. 3 is a view of two UASs configured with lighting systems illuminating a water display.

Another embodiment of the current invention involving multiple UASs is now described with reference to FIG. 3. As shown, UASs 10 may simultaneously illuminate water display 500 or other type of feature. In this embodiment, multiple UASs 10, each configured with lighting systems 100, may be choreographed to illuminate water or other display features as part of the overall visual effect of display 500. For example, two UASs 10 with lighting systems 100 may perform a spiral maneuver around a vertical fountain stream or streams 512 together. In this example, as depicted in FIG. 3, UASs 10 may be positioned apart from each other by 180 degrees such that each UAS 10 may illuminate opposite sides of vertical water stream 512 during the maneuver, moving up and down while encircling and illuminating stream 512. Each UAS lighting system 100 may also utilize a different color of light thus adding to the visual effect.

The foregoing is just one example of how UASs 10 may be used in the current invention and is not intended to limit the scope of the invention. Indeed, the manner in which UASs 10 may be used with or engage display 10 are almost limitless.

It should also be noted that because UASs 10 may perform entirely off the ground, they pose minimal obstruction of display 500 to the audience. This is a significant advance when considering the potential obstructions that would be posed by the tracks or wires with lighting carriages that would need to be constructed to provide this visual effect with a ground-based lighting system. While the above example described two UASs 10 used in combination, any number of UASs 10 may be used. In addition, multiple UASs 10 may be used to illuminate water display 500 independently of each other and not in a choreographed fashion.

The increased flexibility in the visual effects of display 500 with the use of UASs 10 is also shown as follows. Because UAS lighting systems 100 do not require the design and construction of ground based platforms or mounts, the use of UAS lighting systems 100 may allow for much greater flexibility in the modification of water streams 512 within water display 500, as well as the illumination of these targets. For instance, if water display 500 were to be enlarged to include the addition of several newly built water elements 512, there may be no need to design and construct new lighting systems to accommodate the modification since these new water streams 512 may be illuminated by a re-choreographed fleet of UAS lighting systems 100.

In addition, the illumination of water streams 512 may be readily modified. For example, the intensity of the illumination provided may be adjusted to accommodate changes in the surroundings, e.g., where shadows are created by a newly-built neighboring building. In this situation, the fleet of UAS lighting systems 100 may be modified with no ground construction necessary. In this example, lighting assemblies 110 may be changed to include a higher intensity light source, or another UAS lighting system 100 may be added to provide additional illumination.

Figure 4:
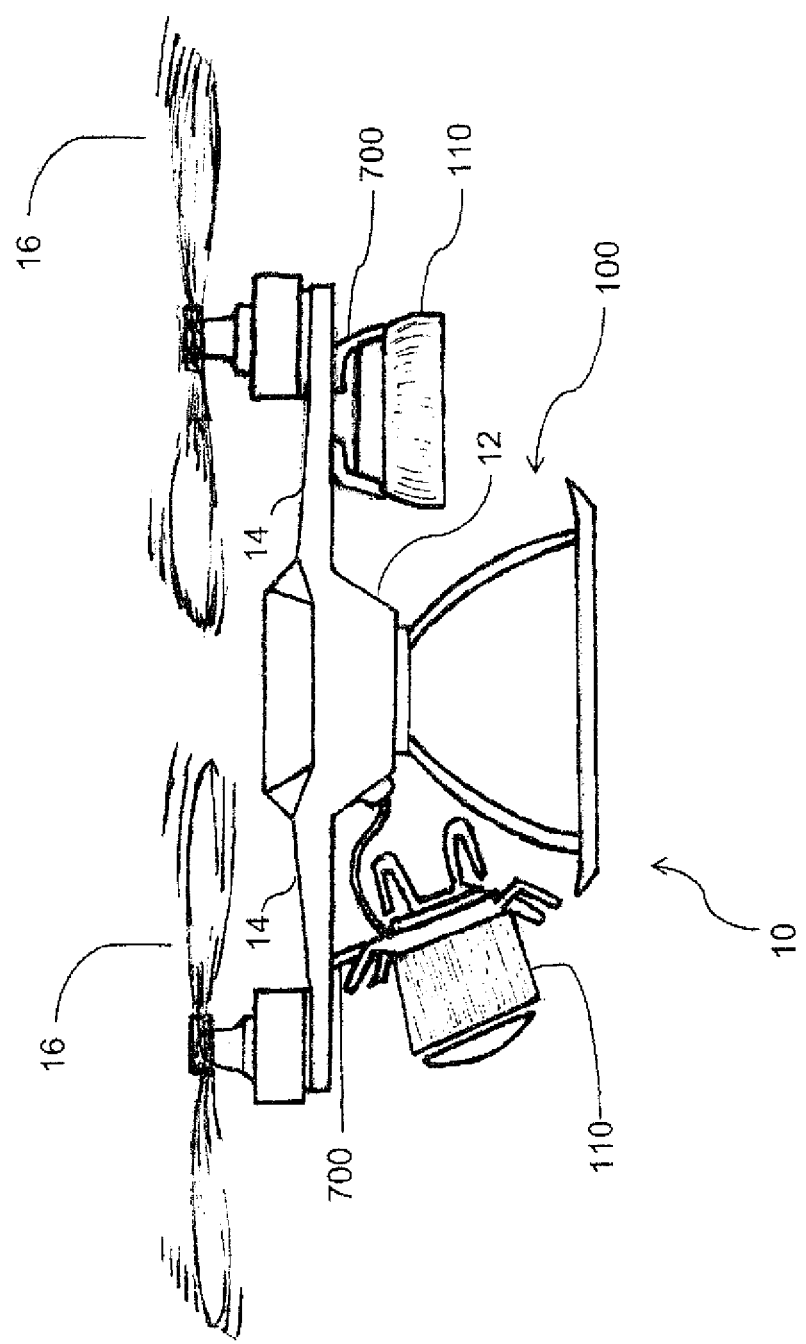
FIG. 4 is a view of a lighting system mounted to a UAS configured with a fixed mount.

The manners in which single and multi-UAS 10 embodiments may be configured is now further described. In one embodiment, as shown in FIG. 4, lighting system 100 may be integrated into or otherwise attached to UAS 10 using mount(s) 700. In this embodiment, mount(s) 700 may include brackets, bolts, locks, latches or other attachment means to secure and position lighting system 100 relative to UAS 10. To this end, lighting system(s) 100 may be connected to UAS body 12 and/or arm(s) 14. In any event, lighting assemblies 110 are preferably connected to UAS 10 so that lighting assembly 110 may shine light upon a desired target while UAS 10 flies, hovers or is located in a desired location(s).

Mount 700 may secure lighting system 100 and lighting assembly 110 in a fixed position or may allow lighting system 100 and lighting assembly 110 to be controllably moved side to side, up and down, at an angle, rotated about an axis or in any other direction. These movements may allow a target to be more precisely illuminated. This may also allow lighting system 100 to write words, create illustrations or produce other images on a surface. Controllable mount 700 may be preprogrammed, manually controlled by the pilot of UAS 10, controlled by an automated control system or controlled by other means.

Each UAS 10 configured with lighting system 100 may be controlled individually or in combination with other UAS lighting systems 100 by a pilot in real time, or by a computer or other type of automated controller. Aspects of UAS 10 and lighting system 100 that may be controlled may include: 1) the position and flight coordinates of each UAS 10 with respect to the illumination targets, other UASs 10 in the fleet and any other nearby structures, 2) the position and orientation of lighting system 100 with respect to UAS 10 and illumination targets, 3) the lighting sequences to illuminate the targets in relation to the position of each UAS 10, 4) the position of UASs 10 in relation to observers for safety purposes and 5) any other aspect that may need to be controlled to allow the illumination of water display 500 by UAS lighting systems 100. The flight of at least one UAS 10 may be synchronized with the water 512 being shot out of at least one water fountain 500.

UAS(s) 10 may include an onboard controller with software to control its flight, or software may be used in a controller that transmits control signals to UAS(s) 10. Wherever this software resides, it may include pre-programmed choreography sequences to allow for fully automated shows to take place with minimal human intervention. Conversely, the software may allow for the manual orchestration of UAS lighting systems 100. In addition, the software may allow for a combination of automated pre-programmed shows that may be manually altered or otherwise manually controlled in real time as desired. UASs 10 may include a GPS device so that its coordinates may be used by the software to control its next movements and to ensure UASs 10 remain in their intended flight path. Alternatively, UAS 10 may include one or more cameras, transmitters or other mechanisms that may determine positional information and relay the physical location of UASs 10 to a computer or controller so that the ensuing movement of UAS 10 may be appropriately controlled. To this end, the GPS, camera or other means to determine location may act in a control loop to continuously or semi-continuously correct, adjust or alter the location or flight of UAS 10.

Figure 5A:
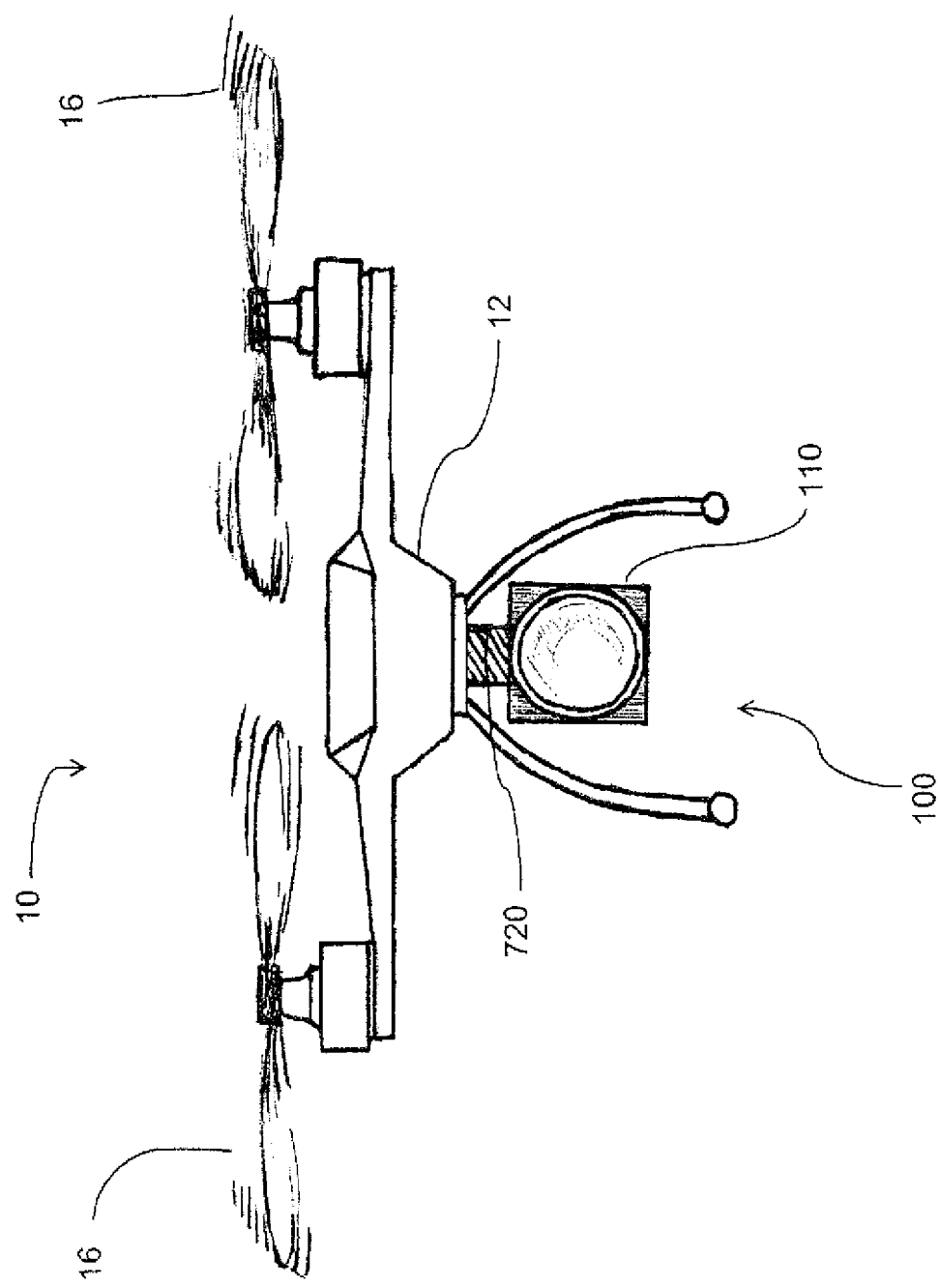
FIG. 5A is a view of a lighting system mounted to a UAS configured with an extendable arm in a retracted position.
Figure 5B:
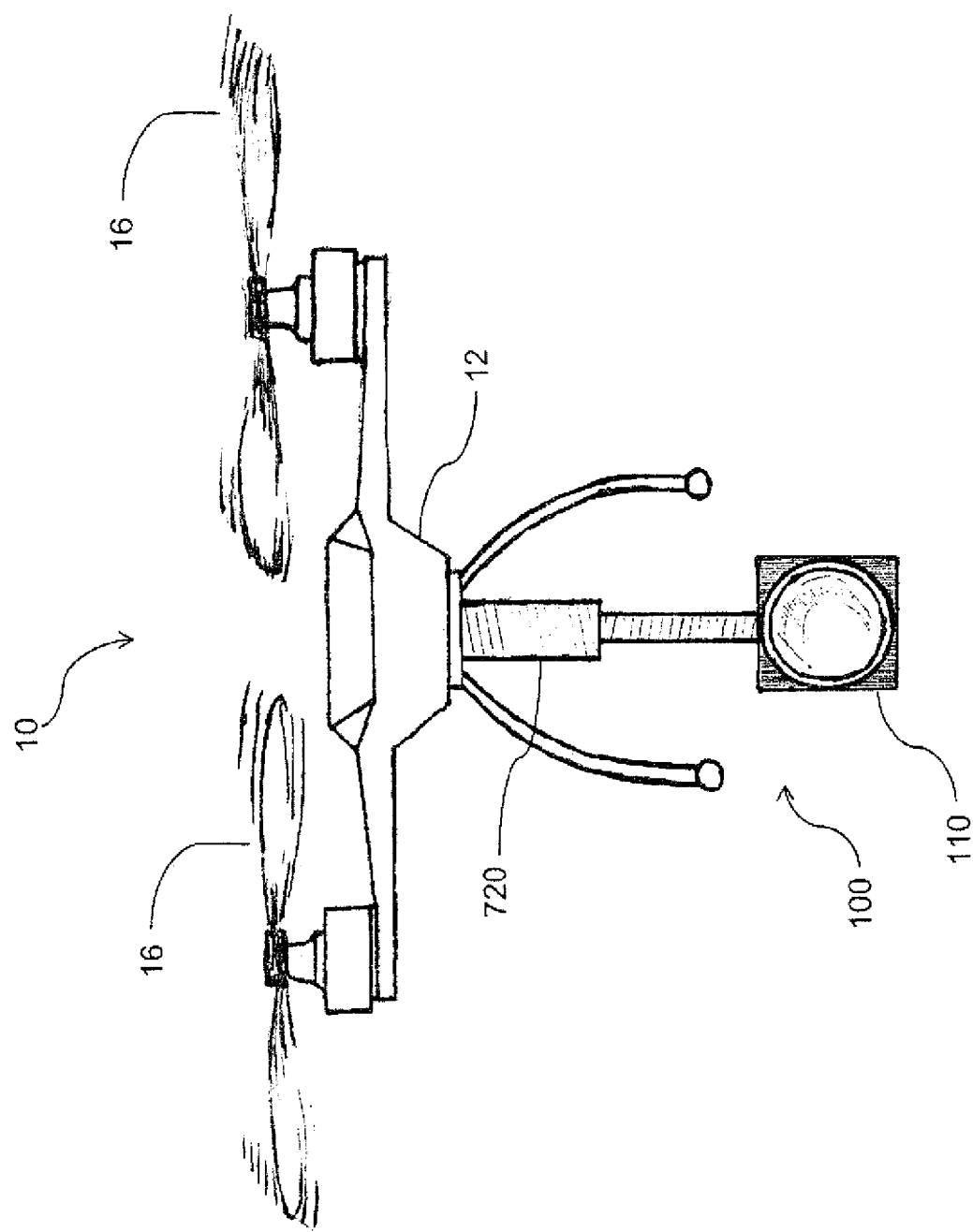
FIG. 5B is a view of a lighting system mounted to a UAS configured with an extendable arm in an extended position.

In another embodiment, as shown in FIGS. 5A and 5B, lighting system 100 may be attached to UAS 10 using an extendable arm 720. FIG. 5A depicts extendable arm 720 in a generally retracted configuration, and FIG. 5B depicts extendable arm 720 in a generally extended configuration. Extendable arm may be preferred for certain UAS 10 maneuvers. For example, while UAS 10 may physically pass through water streams 512, water particles 514 and/or water mist 516 without the threat of damage to UAS 10 or the disruption of its flying capabilities, it may be preferable for propellers 16 of UAS 10 to avoid physical contact with the foregoing. Accordingly, arm 720 may be extended to allow light 100 to pass through stream(s) 512, droplets 514 or mist 516 while propellers remain above. This may be desirable when, for example, light 110 is intended to fly through high velocity water streams 512 to avoid the force of these streams 512 disrupting the flying capabilities of UAS 10 or otherwise altering its position or course. However, with extendable arm 720, UAS 10 may be safely positioned near stream 512, and then extend extendable arm 720 may be extended such that lighting system 100 may be moved to a position that is now closer to, or possibly in physical contact with, water steam 512.

As shown in FIGS. 5A, 5B, arm 720 may include segments 722, 724 that may, for example, be nested together while in the retracted position of FIG. 5A, but which may extend and lengthen arm 720 in the extended position in FIG. 5B. Other means to lengthen arm 720 may also be used.

While FIGS. 5A and 5B depict extendable arm 720 as extending in a generally downward direction, extendable arm 720 may extend in generally sideways direction, a generally upward direction or in any other direction. It should be noted that extended arm 720 may be in a retracted position as depicted in FIG. 5A for UAS 10 takeoff and landing such that lighting system 100 does not interfere with these operations.

A benefit of extendable arm 720 is that by positioning lighting system 100 closer to display 500, the illumination of water stream 512, droplets 514 or mist 516 may be higher in intensity and more vibrant in color due to the optical properties of light shining through water at close range, while still keeping distance between stream 512 and propellers 16. In sum, enhanced lighting effect may be unachieved.

As additional examples, UAS 10 may be positioned directly above vertical water stream 512 and may lower lighting system 100 directly into the top portion of water stream 512 to illuminate it from within for a dramatic visual effect. UAS 10 may also hover or fly in a path that is just above the surface of water in water basin 518 such that lighting system 100 may be submerged into basin 518, thus "painting" colored light onto the water's surface.

Enabling lighting system 100 to come into physical contact with water of stream 512, water droplets 514 or water mist 516 may also provide the additional benefit of cooling lighting system 100. With typical ground based lighting systems, lighting assemblies may be submerged or in close proximity to the water in basin 518 of water display 500 and may be cooled by the water. These assemblies may also be submerged or in close proximity to water steams 512 or in the path of water particles 514 for cooling purposes as well. By enabling UAS lighting systems 100 to come into physical contact with water streams 512, water particles 514 or water mist 516, or to be submerged into water basin 518 while in flight, UAS lighting system 100 may also benefit from the cooling properties of the water display elements.

While extendable arm 720 is depicted in FIG. 5B as telescoping, it may also extend through the use of foldable arms or sections, or may extend by other means. In addition, there may be configurations where the arm may not be extendable but instead may be of a fixed length and may still provide the benefits described above. For example, a balanced rod (not shown) may project from UAS 10 to position lighting assembly 110 into water stream 512, water particles 514, water mist 516, water basin 518 or into other elements of fountain 500.

Figure 6A:
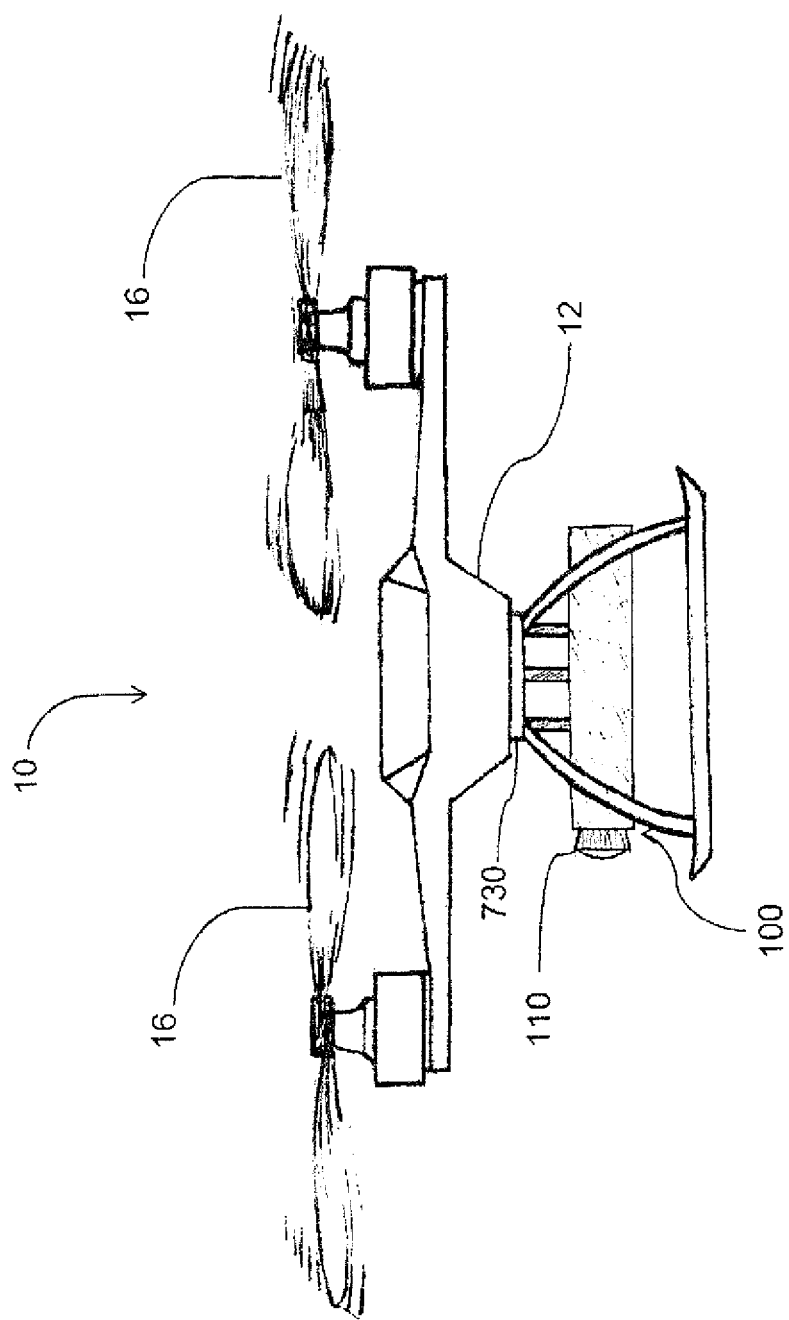
FIG. 6A is a view of a lighting system mounted to a UAS configured with a retractable cable assembly in a retracted position.
Figure 6B:
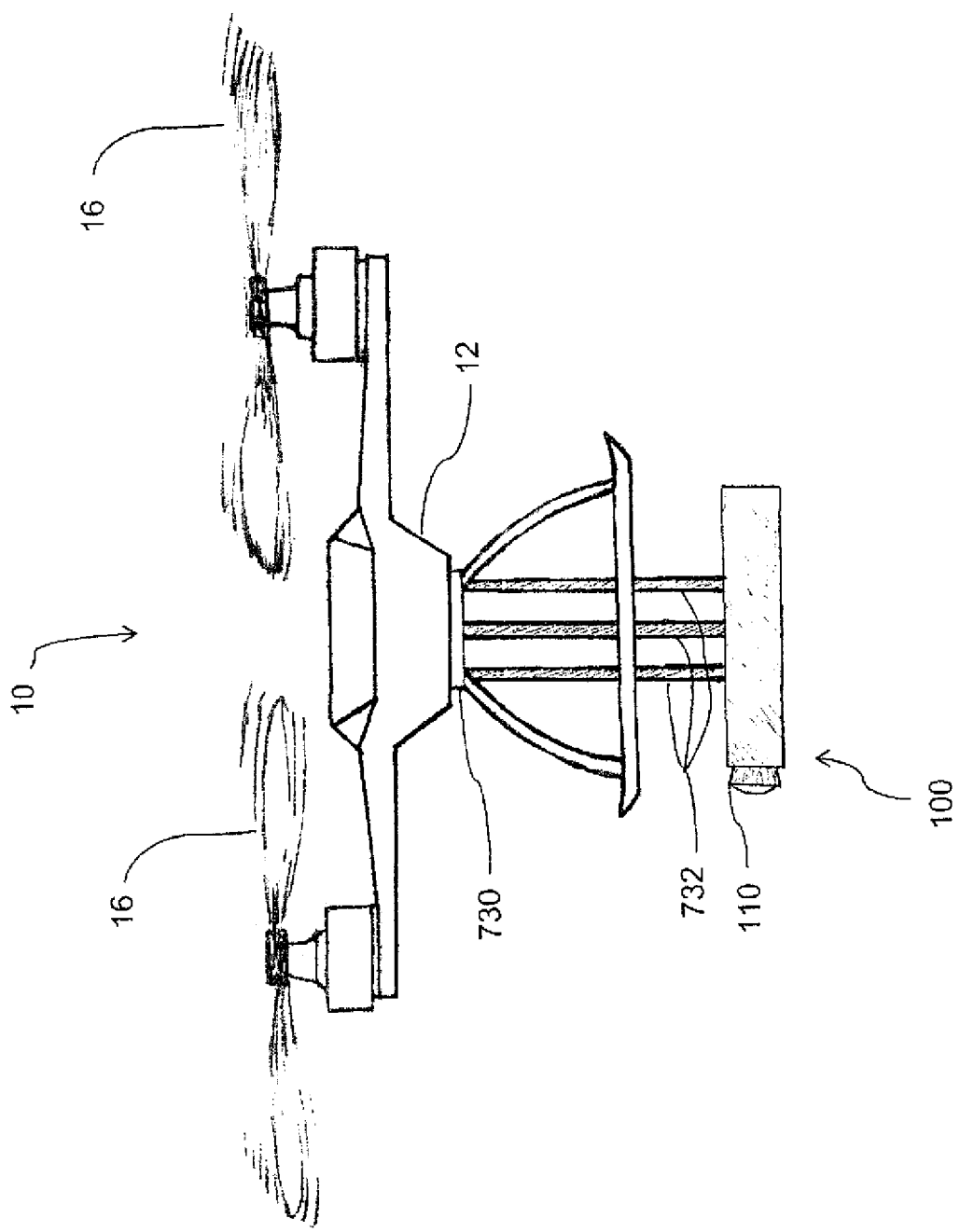
FIG. 6B is a view of a lighting system mounted to a UAS configured with a retractable cable assembly in an extended position.

In another embodiment as shown in FIGS. 6A and 6B, lighting system 100 may be attached to UAS 10 by a retractable cable assembly 730. FIG. 6A depicts retractable cable assembly 730 in a generally retracted or recoiled configuration and FIG. 6B depicts retractable cable assembly 730 in a generally extended configuration. Similar to extendable arm 720 described above, UAS 10 configured with retractable cable assembly 730 may safely position itself beyond water stream 512, and then may lower lighting system 100 by extending cables 732 of retractable cable assembly 730 such that lighting system 100 may be moved to a position that is closer to, or immersed in, water steam 512.

The use of multiple extendable cables 732 may be preferable when lighting system 100 is in a generally lowered position in order to provide additional stabilization and to help minimize the rotation or other movement of lighting system 100 relative to UAS 10. FIG. 6B depicts the use of three extendable cables 732 to secure and lower lighting system 100 but other numbers of cables or other tethers 732 may be used. FIG. 6B also depicts the cables 732 configured in a straight line to support lighting system 100, but other configurations may be utilized such as three cables that form a triangular cross-section, four cables that form a square cross-section or other configurations.

Cables 732 of retractable cable assembly 730 may be similar to each other or have different cross-sectional configurations. While FIG. 6B depicts three cables 732 generally parallel to each other, retractable cables 732 may be configured at different angles with respect to each other. As with extendable arm 720, it may be preferable for retractable cable assembly 730 to be in a generally retracted or recoiled position as depicted in FIG. 6A for UAS 10 takeoff and landing such that lighting system 100 does not interfere with these operations. Alternatively, as with the operation of aircraft that tow banners and streamers, cables 732 may be laid out in careful order to enable takeoffs and landing, or snared and dropped by UASs 10 already in flight.

This retractable cable embodiment provides the benefits described above in connection with the extendable arm 720. In addition however, retractable cable assembly 730 may have the ability to lower lighting system 100 further down and away from the body 12 of UAS 10 when compared to extendable arm 720. This may be due to fact that coiled cables may take up less physical space on a payload of UAS 10 compared to extendable sections of extendable arm 720, and because of this, more length of coiled cables may be carried by UAS 10.

Using the same example as described above, UAS 10 may position itself vertically above water stream 512 and may lower lighting system 100 and lighting assembly 110 into the top of water stream 512 by uncoiling retractable cable assembly 730. Because UAS 10 may be able to lower lighting system 100 to a greater distance below its body 12, lighting system 100 and lighting assembly 110 may be lowered further into water stream 512.

With enough cable length available from retractable cable assembly 730, UAS 10 may be able to position itself high enough above water stream 512 to be generally out of the primary viewing area of the audience, and may lower lighting system 100 and lighting assembly 110 from the top of water stream 512 to a position generally towards the bottom of water stream 512. In this example it may be preferable that lighting assembly 110 comprise of a multi-directional light such that the outer circumference of water stream 512 may be illuminated evenly from the inside as lighting assembly 110 travels up and down the inside of water stream 512. This may create a dramatic and entertaining water display effect that may be difficult to achieve with ground base lighting systems.

It should be noted that different desired lighting effects and choreographed UAS 10 movements may require lighting system 100 to be positioned at different distances below body 12 of UAS 10. Accordingly, it may be preferable that extendable arm 720 and/or retractable cable assembly 730 have the ability to position lighting systems 100 at varying distances from UAS 10.

In the embodiments described above, it is preferred that lighting system 100 be removable from UAS 10 so that it may be attached when needed and removed when not. This may allow UAS 10 to be fitted with the lighting system 100 for use in providing light to a water display 500 or other structure, and to then be utilized without lighting system 100 for other purposes.

Figure 7A:
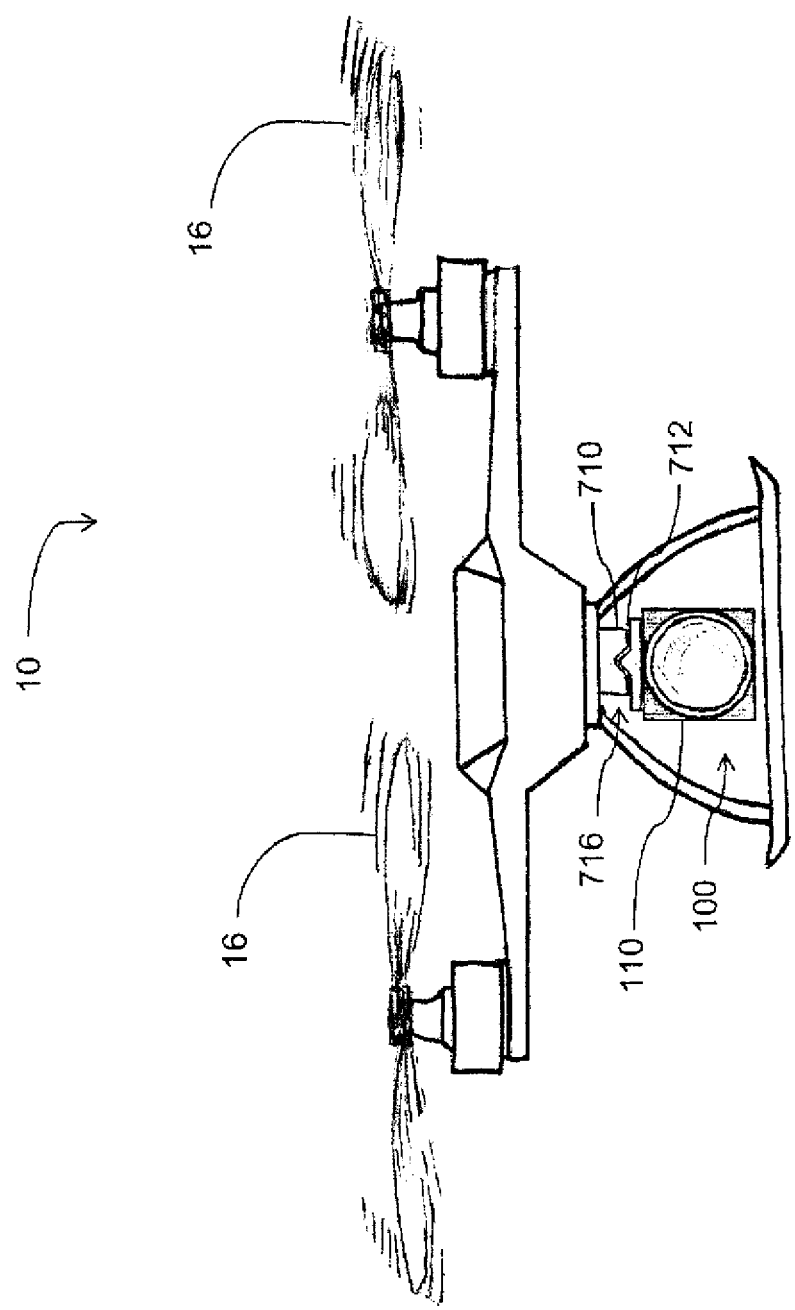
FIG. 7A is a view of a lighting system mounted to a UAS configured with a releasable mount in a mated position.
Figure 7B:
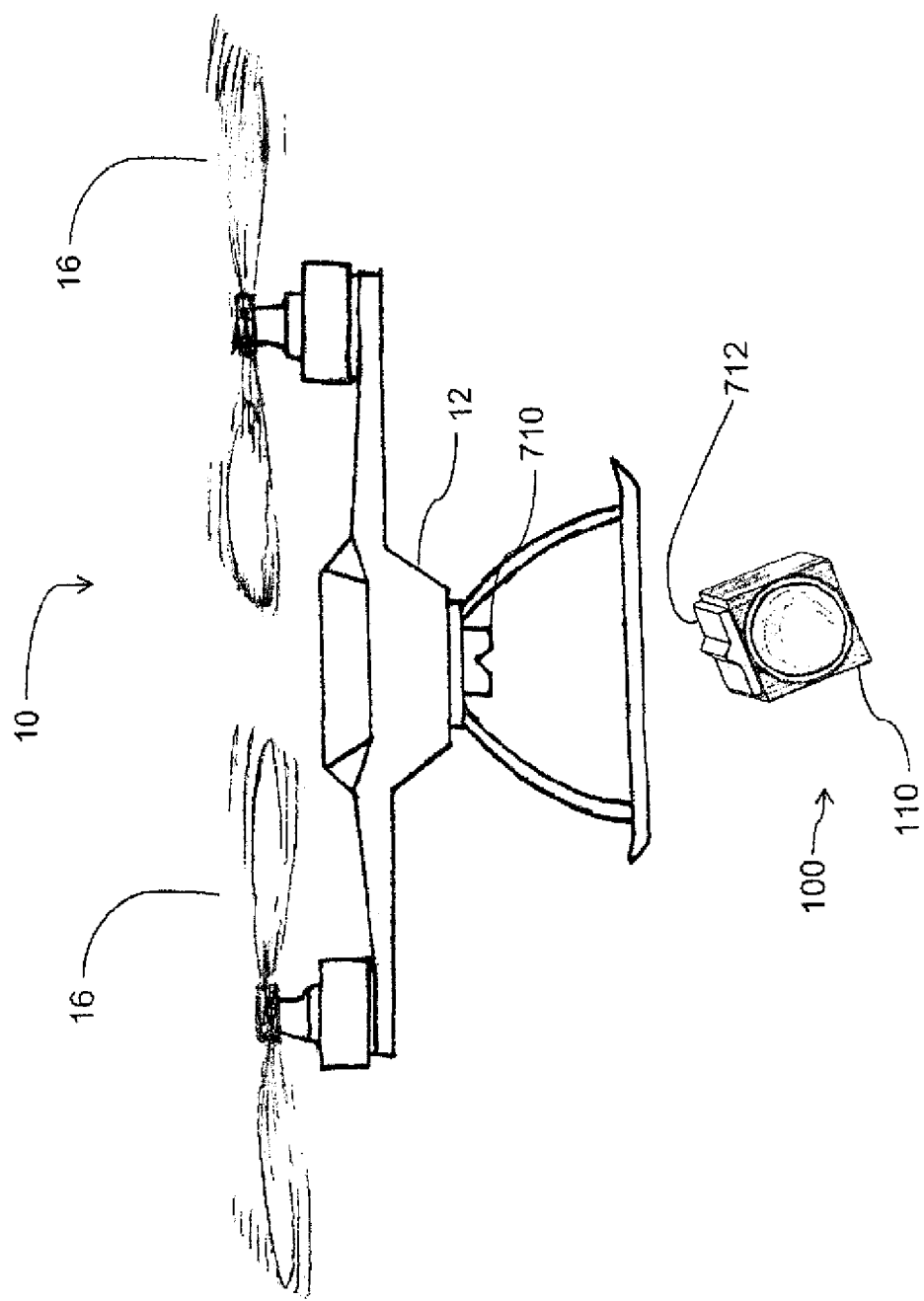
FIG. 7B is a view of a lighting system mounted to a UAS configured with a releasable mount in a released position.

For example, lighting system 100 may be replaced with a releasable payload mounting system 716 as shown in FIGS. 7A and 7B. The removable payload may comprise many different types of items. For example, the payload may comprise a light that is dropped from UAS 10 while in flight during a performance so that the falling light may form part of the overall performance of display 500. As another example, the payload may be a pyrotechnic feature that ignites after being dropped during a performance. In another example, the payload may be a weighted object that is released so that it splashes in pool 518 of display 500.

To control the time when such item falls, payload mounting system 716 may be programmed to disengage at a desired time in the performance as part of a choreographed event. Alternatively, payload system 716 may be programmed to disengage when UAS 10 is located at a particular location defined by GPS coordinates and/or altitude.

System 716 may allow different payloads to be mounted onto UAS 10 using various securing mechanisms. For example, as depicted in FIGS. 7A and 7B, UAS 10 may include a female mounting component that may be attached to body 12 or other component of UAS 10, and lighting system 100 may include a male mounting component 712. With this configuration as depicted in FIG. 7A, male component 712 may be secured to female component 710 such that lighting system 100 may be securely attached to UAS 10 for use in lighting a water display as described above.

When lighting system 100 is not needed or when it is desired that UAS 10 be used for other purposes, male mount 712 may be disengaged from female mount 710 so that lighting system 100 separates from UAS 10 as depicted in FIG. 7B. While this specification describes releasable mounting system 716 as having male and female components 712, 710, and while FIGS. 7A and 7B show mounting system 710 and mounting system 712 as female and male components, respectively, other releasable mounting systems 716 are within the scope of the current invention.

Furthermore, in mounting system 716, component 710 need not be male and component 712 need not be female. Instead, their configurations may be reversed. Alternatively, mounting system 716 may comprise other locking mechanisms, bolts, screws, latches and other components that may securely mate to each other and attach lighting system 100 to UAS 10. Also, when lighting system 100 is not attached to UAS 10, other payloads may be securely attached to UAS 10 using similar mounting systems 716 for use with other applications. Also, lighting system 100 with male mounting system 712 may also be securely attached to a different UAS 10 configured with a female mounting system 710.

Releasable mounting system 716 may also be utilized with extendable arm 720 depicted in FIGS. 5A and 5B, in the above embodiment regarding retractable cable assembly 730 depicted in FIGS. 6A and 6B, and/or in other embodiments described throughout this specification. For instance, extendable arm 720 configured with lighting system 100 may be removably attached to UAS 10 utilizing releasable mounting system 716 as described above. Similarly, retractable cable assembly 730 configured with lighting system 100 may be removably attached to UAS 10 utilizing releasable mounting system 716 as well. In addition, lighting system 100 may be removably attached to either extendable arm 720 or retractable cable assembly 730 in a similar manner.

There are various benefits of removable lighting assemblies 100, payloads or other items that may be attached and detached from UAS 10. First, if UAS 10 becomes damaged or requires maintenance, lighting system 100 may be readily removed from the damaged UAS 10 and installed onto a different UAS 10 configured with female mounting system 710. This may limit any downtime of display 500 that includes UAS(s) 10 since lighting system 100 may readily be redeployed on a different UAS 10. Also, because lighting system 100 may be removed from UAS 10 when not in use, other payloads may then be attached to UAS 10 for other purposes, so UAS 10 may be utilized for other projects. This may allow for several projects to share the expense of the purchasing, leasing, renting, maintaining and operating UAS 10 since UAS 10 may be configured to support each project with different payloads at any given time. Additionally, lighting system 100 may be a fully self-contained item with rechargeable battery or power source and control systems, and thus allow for rapid swapping of depleted systems for fully charged electrical lighting units.

Figure 8:
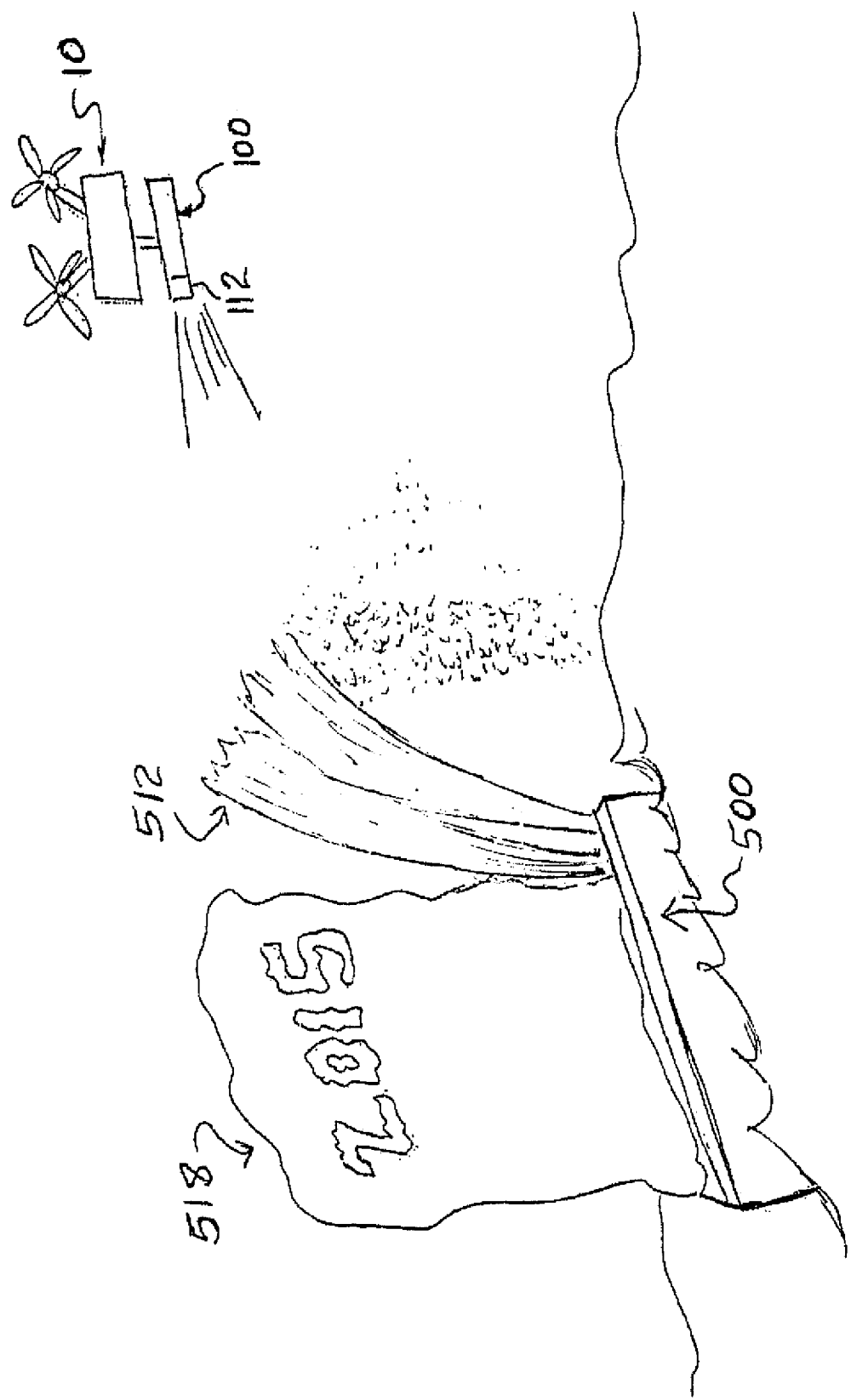
FIG. 8 is a view of a UAS configured with a projector assembly projecting an image onto a water display.

In another embodiment depicted in FIG. 8, but also with reference to other figures, UAS lighting system 100 may include projector assembly 112 that may project images or video onto a target such as adjacent water stream 512 (e.g., FIGS. 1 and/or 8) or water curtain that forms water wall 518 within fountain 500 (FIG. 8). UAS 10 configured with projector assembly 112 may project an image or video onto water wall 518 such that the image or video may be viewable by an audience. It may be preferable that adjacent water streams or wall 518 comprise a waterfall, a funnel shaped stream or another type of water stream or water feature that may have a width sufficiently wide to allow an image or video to be projected onto it and be viewed by an audience.

In one configuration, UAS 10 equipped with projector assembly 112 may project images or video onto water wall 518 and an audience may view the images or video from generally the same side of water wall 518. This may be similar to a movie theater where the audience and the projector are positioned on the same side of the viewing screen. In another configuration, an audience may be generally positioned on the opposite side of water wall 518 compared to UAS 10 such that images and video projected by projector assembly 112 may project onto and pass through water wall 518 such that they are viewable on the opposite side. Both of these configurations may add a very dramatic and exciting element to a lighted water display show.

Figure 9:
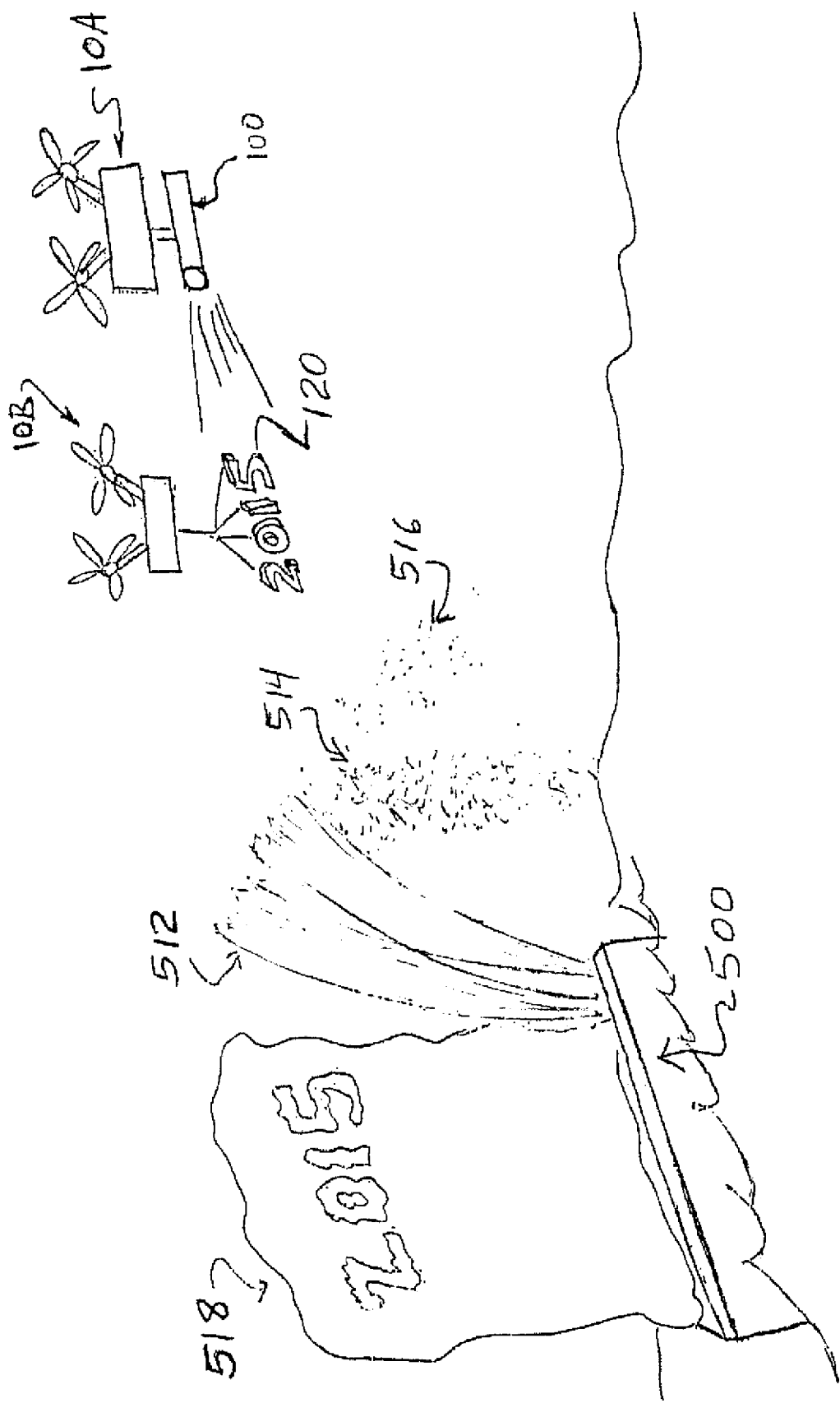
FIG. 9 is a view of a UAS configured with a shape casting a shadow onto a water display.

In another embodiment as depicted in FIG. 9, UAS 10A with lighting system 100 may shine light onto a separate UAS 10B that may be configured with a "shadow puppet" shape 120 such that the shape 120 may cast a shadow onto a surface behind it such as a water wall 516, water particles 514, water fog 516, a screen or other type of target or surface. Water wall 516 may comprise a series of adjacent water streams 512, a waterfall, a funnel shaped stream, or another type of water stream that may have a width sufficiently wide to allow the shadow cast by shape 120 onto water wall 516 to be viewable by an audience.

While FIG. 9 depicts shadow puppet shape 120 as generally hanging below UAS 10, shape 120 may be positioned to the side, above or in any other position or configuration with UAS 10. In addition, shape 120 may be integrated with UAS 10 such that UAS 10 and shape 120 together may cast the shadow. Also, shape 120 may be a static shape as depicted in FIG. 9, or may have the ability to dynamically change such that the shadow it may cast may also change. In one example, to celebrate a New Year's Eve event, shape 120 may change from the numerals that represent the current year to the shape of the numerals that represent the New Year. For instance, if the current year was 2014 and the New Year was 2015, shape 120, and the shadow cast by shape 120, may change from the numerals 2014 to the numerals 2015 to reflect the changing of the year.

Figure 10:
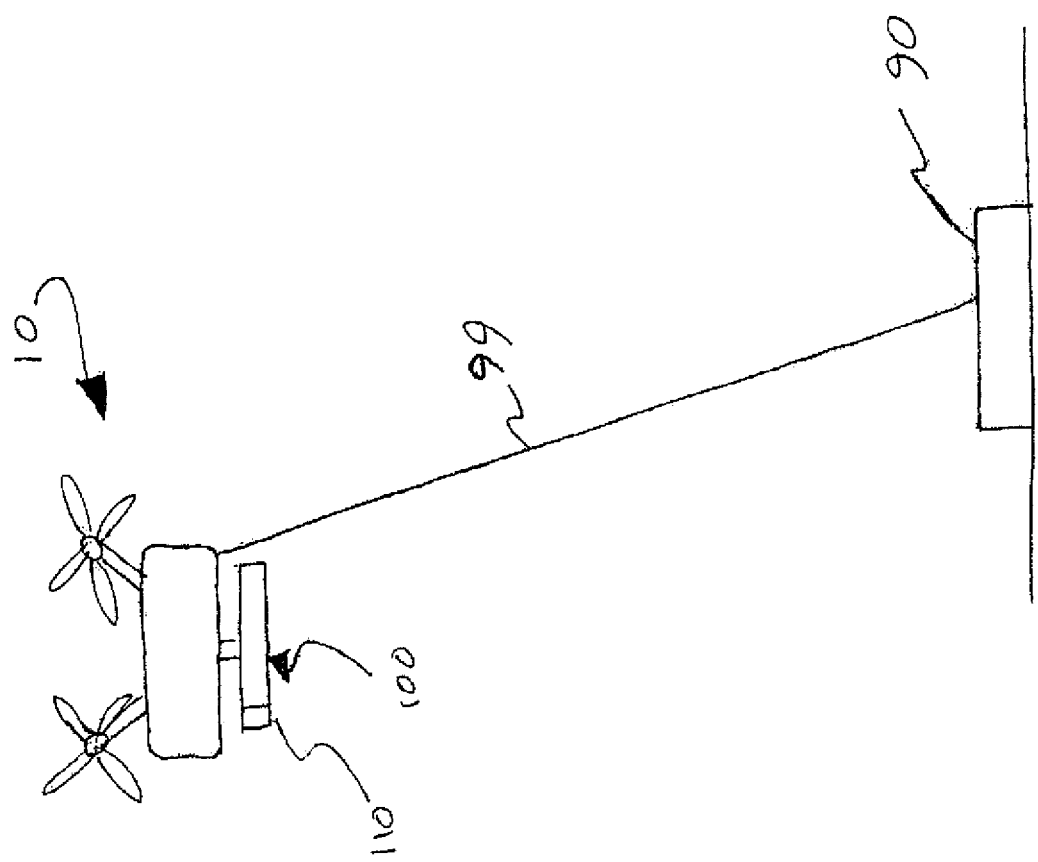
FIG. 10 is a view of a UAS attached to a tether.

In another embodiment as depicted in FIG. 10, UAS 10 may include tether 99 that may couple UAS 10 to a ground-based station 90 or operator. Tether 99 may provide safety by preventing UAS 10 from flying beyond areas deemed safe for UAS 10 or from simply flying off. For example, should UAS 10 malfunction and crash, tether 99 may be of a chosen length at any point in time during a light show that it may not allow UAS 10 to enter or otherwise crash into an area where an audience may exist.

Accordingly, it may be necessary for the length of tether 99 to be shortened and/or lengthened in real time during the show to account for the position of UAS 10 such that UAS 10 does not enter an unsafe location. This control may be manual or may be provide by a computer or other type of controller. Tether 99 may also provide power and other control signals to UAS 10. This may eliminate the need for an on-board power source, or may avoid the need to recharge or replace batteries or other power sources that may be utilized by UAS 10. Furthermore, the duty cycle of signal provided by tether 99 may remain constant.

An advantage of tether 99 may be that it may allow UAS 10 to be fitted with more light assemblies 100 because no battery or other on-board power source may be needed. In other words, more light assemblies 100 may be added because the increase in weight they represent may be offset by the subtracted weight of the battery.

Tether 99 may also transmit electrical signals to control UAS 10, as opposed to the radio frequency signals that are typically used with untethered UASs 10. This is a benefit because radio signals may be interfered with by nearby electrical appliances and/or third parties. To this end, tether 99 allows two way communication between ground station 90 or operator, and UAS 10. That is, tether 99 may also support signals from UAS 10 to the ground. Such signals may include position data and status of lights or other on-board appliances.

In addition, by utilizing tethers 99 so that UAS 10 need not carry a battery and/or other payload, UAS 10 may weigh less than a specified amount to avoid being subject to otherwise pertinent regulations. This may eliminate restrictive regulations imposed by governmental agencies upon the commercial usage of drones. Such commercial UAS regulations may include the following: 1) the UASs may only be flown within the sight of the operator, 2) the UASs may only fly up to 100 miles per hour, 3) operators of the drones must be at least 17 years of age and 4) operators of the drones must pass an aeronautics test and be vetted by the Transportation Security Administration. By utilizing tether 99 and thus avoiding such regulations, UAS 10 depicted in FIG. 10 may avoid the time and costs associated with addressing these restrictions.

Figure 11:
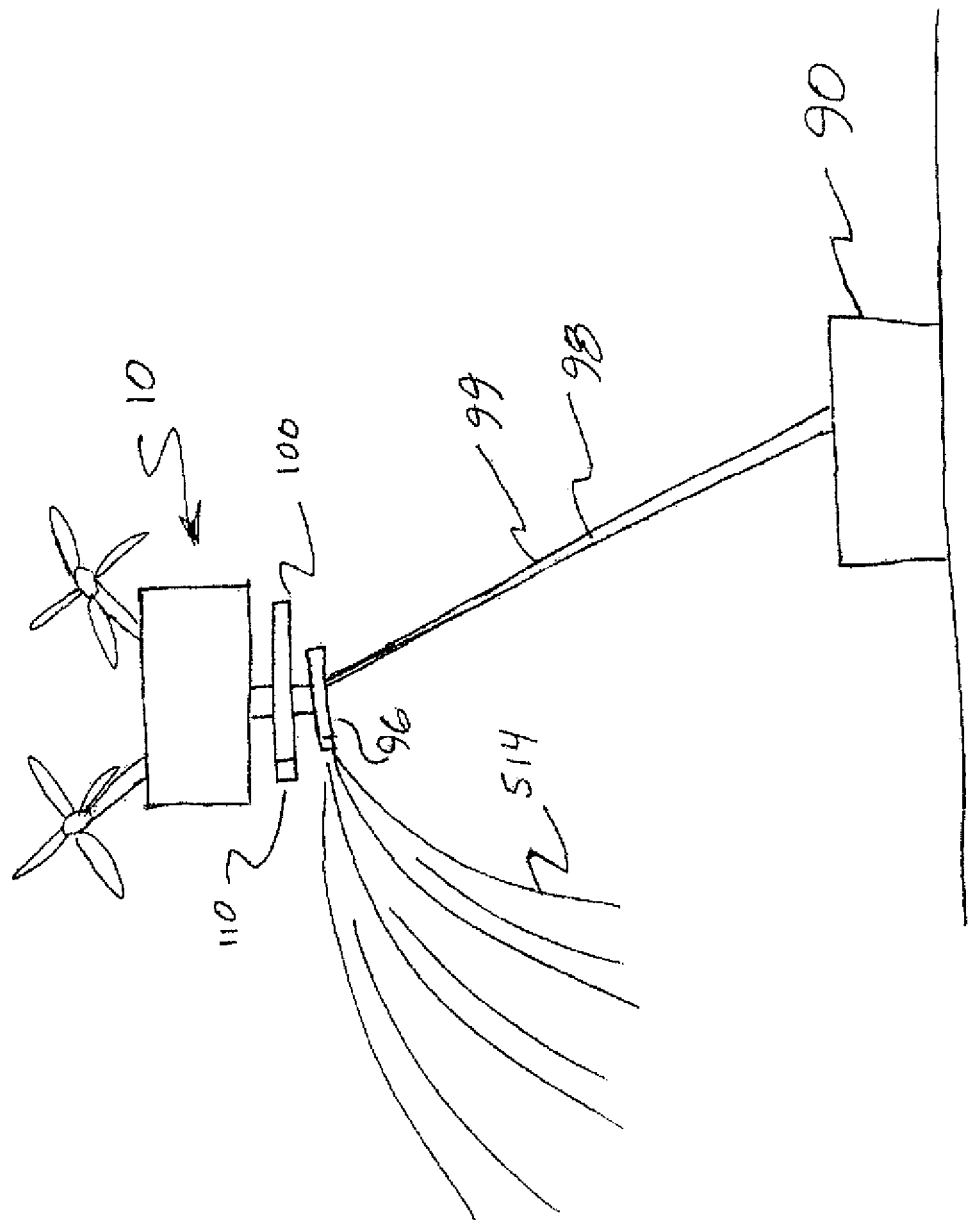
FIG. 11 is a view of a UAS attached to a tether configured with a water line and releasing a water stream.

In another embodiment as depicted in FIG. 11, tether 99 may include water line 98 that may run from a ground based water supply to UAS 10. As such, water may be pumped from the ground to UAS 10 so that water may be launched into the air through water nozzle 96 configured with UAS 10 from a position off the ground. The resulting elevated water streams 514 may create an exciting upside-down fountain effect. These streams 514 may not necessarily be illuminated, or may be illuminated by lighting system 100 residing on the same UAS 10 that may be providing the off-the-ground water stream 514, by a different lighting system 100 configured on a different UAS 10, by a ground based lighting system or by other lighting means. Providing off-the-ground water streams 514 may offer a whole new aesthetic dimension to the water stream features of water display 500.

Figure 12A:
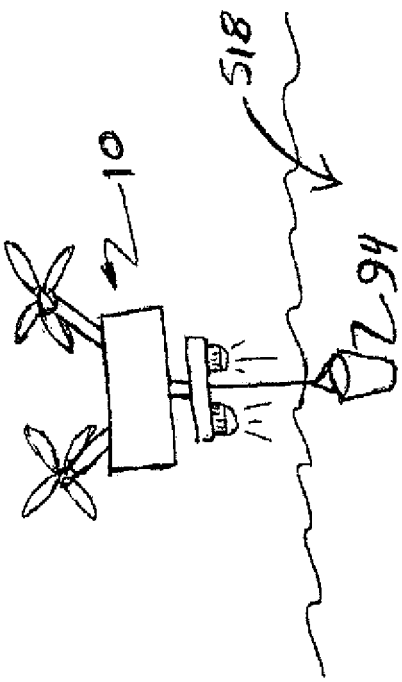
FIG. 12A is a view of a UAS configured with a water container and releasing a water stream.
Figure 12A:
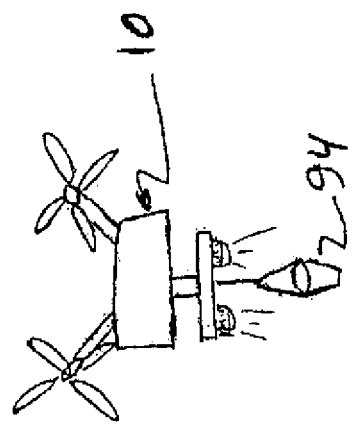
Figure 12A:
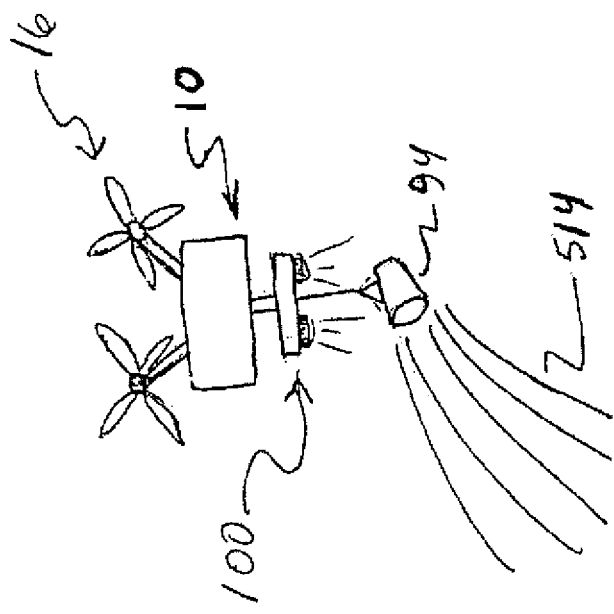

Furthermore, in another embodiment as depicted in FIGS. 12A, 12B and 12C, UAS 10 may be configured with bucket 94, shovel or other type of container that may hold water and that may allow UAS 10 to carry and drop water from positions off the ground. Water container 94 may be filled with water prior to take-off or may have the ability to refill as necessary by being submerged into water basin 518 as depicted in FIG. 12C, or be refilled by other water streams 512 (not shown) or other water sources.

As depicted in FIG. 12B, UAS 10 configured with water container 94 may hover in the air while holding the water, and may then release the water into the air as depicted in FIG. 12A to form off the ground water stream 514. Similar to off the ground water streams 514 in relation to the use of water lines and tethers 99, water streams created by dropping water may not necessarily be illuminated, or may be illuminated by lighting system 100 residing on the same UAS 10 that may be providing the off the ground water stream, by a different lighting system 100 configured on a different UAS 10, by a ground based lighting system or by other lighting means. In this fashion, multiple UASs 10 equipped with containers 94 may drop water in unison in a choreographed dance to create an upside-down fountain effect. Illuminated water falling down from the sky and blending with the water coming up from the ground based fountains 510 may create a very exciting and dramatic water display.

It should be noted that during water feature performances, it is often desirable to clear fog from the water surface and from other areas around water streams in order to allow better viewing of the display. In another embodiment of the current invention, UAS 10 may be configured to direct the generally downward stream of air that is created by its propellers 16 (often referred to as downwash or propwash) onto the water surface, into areas around water streams 512, or to other areas, to clear any undesired fog or mist that may exist. To this end, UAS 10 may include air rudders, channels, or other guide structures that may direct its propwash in a desired and controllable direction. UAS 10 may then be positioned such that its propwash may disperse fog or mist from water display 500 as necessary.

In addition, if the propwash of UAS 10 is not sufficient to clear the water display of undesired fog or mist, UAS 10 may be configured with an additional fan or air blower unit that may achieve the desired result.

Furthermore, the propwash from UAS 10 or the air stream from an additional air blower unit may be used to reshape water streams 512 mid-air, creating new shapes of blown water and mist. In one example, four UASs 10 positioned in equal quadrants around vertical water stream 512 may each channel air streams into water steam 512 at a slightly upward angle in order to create upward shooting spikes of water and mist resulting in a "floating crown".

In another embodiment, UASs 10 may be configured with cameras and memory units to record and save images and video footage of water display 500 from perspectives and vantage points previously unattainable. UASs 10 may also be configured with broadcast units to transmit recorded images or video to a ground station which may project the footage onto a screen or relay it to a large video monitor (such as a Jumbotron) to be viewed by an audience. Or, UAS 10 may have the ability to bypass ground station and broadcast recorded footage directly to a video monitor equipped with a receiver unit to display the footage to the audience in real time. In addition, footage from UAS 10 as described above may also be broadcast on the Internet in real time for audiences around the world to view. In one example, UAS 10 configured with a camera, memory and broadcast capability may position itself directly above water display 500 while recording and broadcasting its footage. Video footage from this vantage point may then be displayed in real time onto a large screen that is viewable to the audience of water display 500, as well as broadcast on the Internet to a global audience, thus giving both audiences a never before seen top-down perspective of water display 500. It can be seen that such video footage or still images may also be recorded and stored for future viewing by similar or different audiences.

Although certain presently preferred embodiments of the invention have been described herein, it will be apparent to those skilled in the art to which the invention pertains that variations and modifications of the described embodiments may be made without departing from the spirit and scope of the invention. It is intended that the claims herein be interpreted to cover any such modifications. It is further intended that the present invention be not limited according to any particular disclosed embodiment, but rather only according to the appended claims.

What is claimed is:

1. A water display providing an overall performance to an audience, comprising:
    at least one nozzle that is configured to emit a stream of water which varies in one or more characteristics and which forms part of the overall performance to the audience of the water display; and
    at least one unmanned aerial system (UAS) that is unattached from the at least one nozzle and that has a flight or orientation which is choreographed to correspond with one or more characteristics of the emitted stream of water;
    wherein the at least one UAS includes a releasable payload light that is dropped from the UAS while in flight at a time during the performance so that the falling light forms part of the overall performance to the audience of the water display; and
    wherein at another time during the performance, the at least one UAS includes a different releasable payload which forms part of the overall performance to the audience of the water display.

2. The water display of claim 1, wherein the flight of the at least one UAS occurs under a computer control.

3. The water display of claim 1, wherein the releasable payload light shines light on at least some of the emitted stream of water.

4. The water display of claim 1, further comprising:
    multiple nozzles that are configured to emit multiple streams of water which vary in one or more characteristics; and
    multiple UASs that are unattached from the multiple nozzles and that have flights or orientations which are choreographed to correspond with one or more characteristics of the multiple streams of emitted water.

5. The water display of claim 4, wherein one or more multiple UASs include a releasable payload light that is shined on at least some of the emitted streams of water.

6. The water display of claim 5, wherein the intensity of the shined light is choreographed to correspond with one or more characteristics of the multiple streams of water.

7. The water display of claim 1, wherein the releasable payload light is attached to the at least one UAS by a mount that is configured to controllably move the light relative to the at least one UAS.

8. The water display of claim 3, wherein the different releasable payload is a pyrotechnic feature.

9. The water display of claim 3, wherein the different releasable payload is a weighted object that is released so that it splashes in a pool of the water display.

10. The water display of claim 8, wherein the pyrotechnic feature ignites after being dropped from at least one UAS.

11. The water display of claim 1, further comprising a controllable mount that movably connects the releasable payload light to the at least one UAS.

12. The water display of claim 1 wherein the releasable payload light and the different releasable payload are programmed to disengage the at least one UAS at a particular location defined by GPS coordinates.

13. A water display providing an overall performance to an audience, comprising:
    at least one nozzle that is configured to emit a stream of water which varies in one or more of its characteristics and which forms part of the overall performance to the audience of the water display; and
    at least one unmanned aerial system (UAS) that is unattached from the at least one nozzle, that has a flight or orientation which is choreographed to correspond with one or more characteristics of the stream of emitted water, and that includes at least one releasable payload that physically detaches and falls from the at least one UAS so that the falling releasable payload is visible to the audience and forms part of the overall performance to the audience of the water display;
    wherein a release of the at least one releasable payload is choreographed with one or more characteristics of the emitted stream of water.

14. The display of claim 13 wherein the at least one releasable payload comprises a physically detachable weight, light or pyrotechnic feature.

15. The display of claim 13 wherein the at least one UAS includes a light, and the at least one UAS shines light on at least some of the emitted stream of water.

16. The display of claim 15 wherein the at least one UAS shines light so as to be choreographed with the emitted water.

17. The display of claim 16 wherein the light shines light on the top of the emitted stream of water.

18. The display of claim 13 further comprising:
    multiple nozzles that are configured to emit streams of water; and
    multiple UASs that are unattached from the multiple nozzles and that have flights paths or orientations which are choreographed to correspond with the direction and/or intensity of the emitted streams of water.

19. The display of claim 18, wherein two or more of the multiple UASs include at least one releasable payload, and a release of the at least one releasable payloads from the multiple UASs is choreographed with the emitted streams of water.

* * * * *